United States Patent
Flor

(10) Patent No.: US 8,572,126 B2
(45) Date of Patent: Oct. 29, 2013

(54) SYSTEMS AND METHODS FOR OPTIMIZING VERY LARGE N-GRAM COLLECTIONS FOR SPEED AND MEMORY

(75) Inventor: Michael Flor, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 0 days.

(21) Appl. No.: 13/168,338

(22) Filed: Jun. 24, 2011

(65) Prior Publication Data

US 2011/0320498 A1  Dec. 29, 2011

Related U.S. Application Data

(60) Provisional application No. 61/358,698, filed on Jun. 25, 2010, provisional application No. 61/443,284, filed on Feb. 16, 2011.

(51) Int. Cl.
*G06F 17/30* (2006.01)

(52) U.S. Cl.
CPC ............... *G06F 17/30017* (2013.01)
USPC ........................................................ 707/797

(58) Field of Classification Search
USPC ......... 707/796, 797, 829, 706, 707, 776, 778, 707/791, 793, 795, 802, 803, 812, 828; 704/1, 9, 10
See application file for complete search history.

(56) References Cited

U.S. PATENT DOCUMENTS 6,584,458 B1 *  6/2003  Millett et al. .................. 1/1
7,739,103 B2 *  6/2010  Deane .............................. 704/9

OTHER PUBLICATIONS

Hakkinen et al., n-gram and decision tree based language identification for written words, 2001, IEEE, 335-338.*
Bentley, Jon, Sedgewick, Robert; Fast Algorithms for Sorting and Searching Strings; Proceedings of the 8th Annual ACM-SIAM Symposium on Discrete Algorithms; 1997.
Bergsma, Shane, Lin, Dekang, Goebel, Randy; Web-scale N-gram Models for Lexical Disambiguation; Proceedings of IJCAI; Pasadena, CA; pp. 1507-1512; 2009.
Bloom, Burton; Space/time Trade-offs in Hash Coding With Allowable Errors; Communications of the ACM, 13(7); pp. 422-426; 1970.
Brants, Thorsten, Popat, Ashok, Xu, Peng, Och, Franz, Dean, Jeffrey; Large Language Models in Machine Translation; Proceedings of the Joint Conference EMNLP-CoNLL; Prague, Czech Republic; pp. 858-867; 2007.
Brants, Thorsten, Franz, Alex; Web 1T 5-gram Version 1; Linguistic Data Consortium; Philadelphia, PA; 2006.

(Continued)

*Primary Examiner* — Jean B Fleurantin
(74) *Attorney, Agent, or Firm* — Jones Day

(57) ABSTRACT

A computer memory stores a data structure representing a ternary search tree (TST) representing multiple word n-grams for a corpus of documents. The data structure includes plural records in a first memory, each record representing a node of the TST and comprising plural fields. At least some n-grams have a sequence of units. The plurality of fields includes one for identifying a given unit of the sequence for a given node, one reserved for storing payload information for the given node, and plural child fields reserved for storing information for a first, second and third child nodes of the given node. The child fields store a null value indicating the absence of the child node or an identifier identifying a memory location of the child node. For at least one record, at least one of the child fields stores an identifier identifying a memory location of a memory different than the first memory.

16 Claims, 8 Drawing Sheets

(56) References Cited

OTHER PUBLICATIONS

Carlson, Andrew, Fette, Ian; Memory-Based Context-Sensitive Spelling Correction at Web Scale; Proceedings of the ICMLA; 2007.
Chazelle, Bernard, Kilian, Joe, Rubinfeld, Ronitt, Tal, Ayellet; The Bloomier Filter: An Efficient Data Structure for Static Support Lookup Tables; Proceedings of the 15th Annual ACM-SIAM Symposium on Discrete Algorithms; New Orleans, LA; pp. 30-39; 2004.
Church, Ken, Hart, Ted, Gao, Jianfeng; Compressing Tirgram Language Models with Golomb Coding; Proceedings of the Joint Conference EMNLP-CoNLL; Prague, Czech Republic; pp. 199-207; 2007.
Emami, Ahmad, Papineni, Kishore, Sorensen, Jeffrey; Large-scale Distributed Language Modeling; Proceedings of ICASSP; pp. 37-40; 2007.
Evert, Stefan; Google Web 1T5 N-grams Made Easy; Proceedings of the 6th Web as Corpus Workshop; Los Angeles, CA; 2010.
Federico, Marcello, Cettolo, Mauro; Efficient handling of N-gram Language Models for Statistical Machine Translation; Proceedings of the ACL 2007 Workshop on Statistical Machine Translation; Prague, Czech Republic; pp. 88-95; 2007.
Fredkin, Edward; Trie Memory; Communications of the ACM, 3(9); pp. 490-499; 1960.
Germann, Ulrich, Joanis, Eric, Larkin, Samuel; Tightly Packed Tries: How to Fit Large Models Into Memory, and Make Them Load Fast, Too; Proceedings SETQA-NLP; Boulder, CO; pp. 31-39; 2009.
Giuliano, C.; jWeb1T: a Library for Searching the Web 1T 5-gram Corpus; Software available at http://hlt.fbk.eu/en/technology/jWeb1t; 2007.
Graff, David; English Gigaword; Linguistic Data Consortium, http://www.ldc.upenn.edu/Catalog/CatalogEntry.jsp?catalogId=LDC2003T05; 2003.
Guthrie, David, Hepple, Mark; Minimal Perfect Hash Rank: Compact Storage of Large N-gram Language Models; In SIGIR 2010 Web N-gram Workshop; Geneva, Switzerland; 2010.
Guthrie, David Hepple, Mark; Storing the Web in Memory: Space Efficient Language Models with Constant Time Retrieval; Proceedings of the 2010 Conference on Empirical Methods in Natural Language Processing; Massachusetts, USA; pp. 262-272; 2010.
Hawker, Tobias, Gardiner, Mary, Bennetts, Andrew; Practical Queries of a Massive N-gram Database; Proceedings of the Australasian Language Technology Workshop 2007; Melbourne, Australia; pp. 40-48; 2007.
Islam, Aminul, Inkpen, Diana; Managing the Google Web 1T 5-gram Data Set; Proceedings of IEEE NLP-KE '09; Dalian, China; 2009.
Lapata, Mirella, Keller, Frank; Web-based Models for Natural Language Processing; ACM Transactions on Speech and Language Processing, 2(1); pp. 1-30; 2005.
Ravishankar, Mosur; Efficient Algorithms for Speech Recognition; Ph.D. Thesis, Carnegie Mellon University, Pittsburgh, PA; 1996.
Raj, B., Whittaker, E.; Lossless Compression of Language Model Structure and Word Identifiers; Proceedings of ICASSP '03; pp. 388-391; 2003.
Sekine, Satoshi; Linguistic Knowledge Discovery Tool: Very Large Ngram Database Search With Arbitrary Wildcards; Proceedings of COLING-08; 2008.
Stolcke, Adnreas; SRILM—An Extensible Language Modeling Toolkit; Proceedings of International Conference on Spoken Language Processing; Denver, CO; 2002.
Talbot, David, Brants, Thorsten; Randomized Language Models Via Perfect Hash Functions; Proceedings of ACL-08: HLT; p. 505-513; 2008.
Talbot, David, Osborne, Miles; Randomised Language Modelling for Statistical Machine Translation; Proceedings of ACL 2007; pp. 512-519; 2007.
Talbot, David, Osborne, Miles; Smoothed Bloom Filter Language Models: Tera-scale LMs on the Cheap; Proceedings of the Joint Conference EMNLP-CoNLL 2007; Prague, Czech Republic; pp. 468-476; 2007.
Wang, Kuansan, Li, Xiaolong; Efficacy of a Constantly Adaptive Language Modeling Technique for Web-scale Applications; Proceedings of IEEE International Conference on Acoustics, Speech and Signal Processing; Taipei, Taiwan; 2009.
Watanabe, Taro, Tsukada, Hajime, Isozaki, Hideki; A Succinct N-gram Language Model; Proceedings of the ACL-IJCNLP 2009; Suntec, Singapore; pp. 341-344; 2009.
Whittaker, E., Raj, B.; Quantization-based Language Model Compression; Proceedings of EUROSPEECH '01; 2001.
Yuret, Deniz; Smoothing a Tera-word Language Model; Proceedings of ACL-08: HLT; Columbus, OH; pp. 141-144; 2008.
Zens, Richard, Ney, Herman; Efficient Phrase-table Representation for Machine Translation with Applications to Online MT and Speech Translation; Proceedings of NAACL-HLT-2007; Rochester, NY; pp. 492-499; 2007.
Chelba, C., Schalkwyk, J., Brants, T., Ha, V., Harb, B., Neveitt, W., Parada, C., Xu, P.; Query Language Modeling for Voice Search; Research at Google, Inc.; pp. 127-132; 2010.
Bentley, Jon, Sedgewick, Bob; Ternary Search Trees; Dr. Dobb's Journal; Apr. 1, 1998.
Flor, Michael; Optimizing Very-Large N-Gram Collections for Speed and Memory; Educational Testing Service, 2010; Jun. 23, 2010.
Flor, Michael; A Fast and Flexible Architecture for Very Large Word N-Gram Collections; Educational Testing Service, 2011; Feb. 2011.
Flor, Michael; Optimizing Very-Large N-Gram Collections for Speed and Memory Fast Lossless Compression; Educational Testing Service, 2011; Apr. 2011.
Wikipedia; Memory-Mapped File; Wikipedia; Jun. 14, 2011.
Yu, Zheyuan; ngrams; http://code.google.com/p/ngrams/; Oct. 9, 2010.
Flint, Wally; Plant Your Data In A Ternary Search Tree; JavaWorld.com; Feb. 16, 2001.

\* cited by examiner

SYSTEMS AND METHODS FOR OPTIMIZING VERY LARGE N-GRAM COLLECTIONS FOR SPEED AND MEMORY

This application claims the benefit of U.S. Provisional Patent Application No. 61/358,698 filed Jun. 25, 2010 and U.S. Provisional Patent Application No. 61/443,284 filed Feb. 16, 2011, the entire contents of each of which are incorporated herein by reference.

BACKGROUND

1. Field of the Disclosure

The present disclosure relates to data structures for storing information for document collections and, in particular, relates to systems and methods for populating and accessing such data structures for word n-gram collections to provide for efficient memory use and enhanced speed of use.

2. Background Information

N-gram language models (LMs) (or n-gram models) for word-level n-grams (i.e., n-grams of words, or word n-grams) have become increasingly of interest as a resource for data-driven algorithms in many areas of computational linguistics. Along with traditional use for speech recognition, n-gram models have been embraced for a variety of text-processing tasks, such as statistical machine translation, text tagging, spelling correction, named entity recognition, word sense disambiguation, lexical substitution, etc. An n-gram of words is a sequence of words where n is an integer. For instance, a single word (e.g., the) is a word 1-gram, a sequence of two words (e.g., the dog) is a word 2-gram, a sequence of 3 words (e.g., the dog barked) is a word 3-gram, etc. A n-gram model as referred to herein is a language model that includes a collection of specified word n-grams (or word n-gram collection) and that provides some statistical information about the word n-grams, e.g., the count for a given word n-gram, which the number of times a given word n-gram appears in the corpus (or corpora) from which the word n-gram collection was generated. So, for instance, a corpus of documents or textual information could be parsed (sequenced) to identify specific word n-grams therein to create a word n-gram collection. Appending statistical information to the word n-gram collection, e.g., the count for each n-gram or frequency of occurrence, for instance, can yield an n-gram model. N-gram models may conventionally be stored in a database (which may be referred to as a n-gram database), which may typically be in the form of a table or index, such that a given record (or row of the table) has a field containing data representing the word n-gram and another field containing data representing the count or frequency for that word n-gram. An n-gram model can include more than just word sequences; it can also include, for instance, information regarding symbols, punctuation, or other linguistic sequences with meaning but not conventionally characterized as words. For brevity, the terminology "n-gram" may be used herein to refer to word-level n-grams as well as other types of n-grams.

Larger and larger text corpora have become available, such as the Google Web1T corpus (Brants and Franz, 2006), for example, and the World Wide Web ("the Web") itself can be used as a corpus. The present inventor has observed that such large corpora combined with increasingly large n-gram lengths (e.g., 5-grams or even higher order) will call for the development of very large word n-gram models, requiring n-gram databases with billions of n-grams and multi-gigabyte storage sizes.

Conventional approaches for storing and deploying very large n-gram models may use file-based indexing (e.g., flat files with additional inverted indexing for search), relational databases (e.g., with SQL-based querying capabilities), or specialized systems such as language model (LM) toolkits (e.g., with custom-engineered encoding approaches). Prefix trees and randomized hashing are two prominent examples of specialized systems. The specialized systems typically utilize the architecture of prefix trees (also called "prefix tries," where each symbol in sequence is represented by a node in a tree structure), or the architecture of randomized hashing (which uses random hash functions to map n-gram strings to their associated counts/probabilities).

The present inventor has recognized that for wider adoption and use of n-gram models, both for research and for practical purposes, there is a need for greater simplicity and greater efficiency for working with n-gram models containing very large collections of n-grams.

SUMMARY

According to one example, a computer memory storing a data structure representing a ternary search tree for word n-grams for a corpus of documents is described. The data structure comprises: a plurality of records, each record representing a node of a ternary search tree and each record comprising a plurality of fields, the ternary search tree representing multiple word n-grams, at least some of said word n-grams comprising a sequence of units, the plurality of records being stored at said computer memory. The plurality of fields of a record for a given node includes a first field for identifying a given unit of the sequence of units for the given node, a second field reserved for storing payload information for the given node, and plural child fields reserved for storing information for a first child node, a second child node and an third child node of the given node; and wherein the plural child fields store one of a null value indicating the absence of an associated child node or an identifier identifying a memory location of the respective child node. For at least one record of said data structure, at least one of said plural child fields stores an identifier identifying a memory location of another computer memory different than said computer memory.

According to another example, a computer-implemented method of populating a data structure in a computer memory is described, wherein the data structure represents a ternary search tree, the ternary search tree representing multiple word n-grams for a corpus of documents. The method comprises: a) selecting a unit of a word n-gram with a processing system, wherein said word n-gram comprises a sequence of units; b) creating a node of a ternary search tree based on the first unit with the processing system, wherein the node is represented by a record of the data structure, the record being stored at said computer memory; c) selecting another unit of the word n-gram with the processing system; d) if said another unit does not already exist as a node in the ternary search tree for said word n-gram, creating another node of the ternary search tree based on said another unit with the processing system, wherein said another node is represented by another record of the data structure; and e) repeating steps (a)-(d) to create additional nodes of the ternary search tree for additional units of a given word n-gram, as well as for other word n-grams. Each of said records comprises a plurality of fields, wherein the plurality of fields includes a first field for identifying a given unit of the sequence of units for a given node, a second field reserved for storing payload information for the given node, and plural child fields reserved for storing information for a first child node, a second child node and an third child node of the given node, wherein the plural child fields store one of a null value indicating the absence of an associated child node or an identifier identifying a memory location of the respective child node. For at least one record of said data structure, at least one of said plural child fields stores an identifier identifying a memory location of another computer memory different than said computer memory. A system comprising a processing system and a memory is also described, wherein the processing system is configured to carry out the method. A non-transitory computer readable medium that stores processing instructions is also described, which when executed, cause a processing system to execute the method.

According to another example, a computer-implemented method of searching a data structure in a computer memory is described, wherein the data structure represents a ternary search tree, the ternary search tree representing multiple word n-grams for a corpus of documents. The method comprises: a) identifying a query comprising a word n-gram, the word n-gram comprising a sequence of units; b) selecting a unit of the query to be a current unit of the query; and c) determining whether the current unit of the query matches a current node of the ternary search tree. The current node is represented by a record in said computer memory, wherein the record comprises a plurality of fields, a first field for identifying a given unit of the sequence of units for a given node, a second field reserved for storing payload information for the given node, and plural child fields reserved for storing information for a first child node, a second child node and a third child node of the current node, and wherein each of the plural child fields store one of a null value indicating the absence of an associated child node or an identifier identifying a memory location of the respective child node. The method also comprises: d) if the current unit of the query does not match the current node of the ternary search tree, then determining whether a presently unsearched child node of the current node exists; e) if an unsearched child node exists in a memory location of another computer memory, said another computer memory being different from said computer memory, then using the identifier stored in the record of the current node to access the respective child node from said another memory; and f) selecting the respective child node to be the current node and repeating step (c). A system comprising a processing system and a memory is also described, wherein the processing system is configured to carry out the method. A non-transitory computer readable medium that stores processing instructions is also described, which when executed, cause a processing system to execute the method.

The subject matter described herein can be useful, for example, in efficiently conducting queries to return responsive documents, aiding in spelling correction, and the like.

BRIEF DESCRIPTION OF THE DRAWINGS

These and other features, aspects, and advantages of the present disclosure will become better understood with regard to the following description, appended claims, and accompanying drawings.

DETAILED DESCRIPTION OF EXEMPLARY EMBODIMENTS

Figure 1:
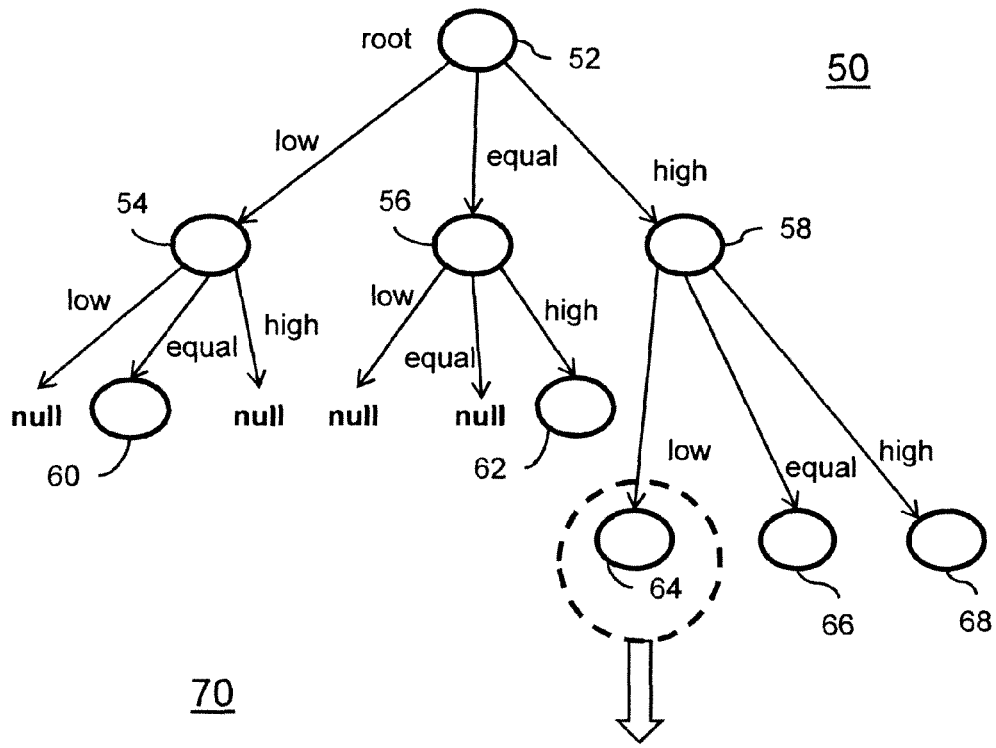
FIG. 1 schematically illustrates a data structure for a ternary search tree according to an example.

In recognizing a need for greater simplicity and greater efficiency for working with very large collections of n-grams and n-gram models, the inventor has considered a number of factors. One factor is the speed of a search of the n-gram collection or n-gram model. For exploratory linguistic research, obtaining n-gram query results within several seconds or even minutes can be satisfactory. For natural language processing (NLP), some applications may be able to utilize a network-based or web-based n-gram query service for satisfactory results. However, for some applications, very fast local n-gram searching may be crucial (e.g. when network service is too slow or unavailable, or when huge numbers of n-grams queries need to be served, e.g., thousands or more per second). Other factors include aspects of portability, deployment and utilization. Portability becomes simpler if the same n-gram database can be used on a variety of platforms. Deployment considerations become less complicated if the same n-gram database can flexibly operate with different CPU and memory resources. While hosting an n-gram model on a dedicated server has advantages, further adoption and use of n-gram models may become more widespread if such n-gram models could be hosted and accessed on modest hardware, while concurrently running other applications.

Other factors considered by the inventor relate to ease of generating a compiled (binary-format) searchable application-gram model. One aspect involves the amount of time, RAM and CPU power it takes to compile a given, pre-tabulated, very large collection of n-grams to generate a corresponding n-gram model. Moreover, it can be quite useful if the same toolkit can also generate and compile an n-gram model directly from text files and then store that model in an n-gram database. Such capability may allow fast generation of n-gram models for different content domains and for specific purposes. Another aspect regarding generation of an n-gram collection or model is versioning, e.g., how easy it is to generate a new compiled and searchable version of the data—for example, with different filters, e.g., with or without punctuation. Another aspect is updateability—whether and how one can update the compiled and searchable n-gram model with additional data, or whether one has to regenerate the entire n-gram model from scratch. The desirability for adaptive language models may arise in certain contexts, for example, when data is accumulated over time or when combining data from multiple sources.

The present disclosure describes an n-gram storage and retrieval system engineered for flexibility and speed and to serve various practical requirements, e.g.: ease of deployment, utilization on a range of different platforms, fast system activation; fast search for literal n-grams; modest and controllable memory utilization, flexible enough to use lots of memory if available (a system should run on high-end and low-end platforms, even laptops), lossless compression, ease of updating the stored model, and capability to run wildcard searches without any additional indexes. Several advantageous features in this design include a) character-level and byte-level granularity of prefixes, b) utilization of ternary prefix trees instead of arrays, c) individually compressing each node record, and d) a hybrid approach to combine mutable in-memory data-structures with serialized compressed records.

FIG. 1 schematically illustrates an exemplary data structure 50 according to one example. As described elsewhere herein, the data structure can be stored in computer memory for efficiently conducting searches of word n-gram models. The data structure 50 comprises a plurality of records 70, wherein each record represents a node of a ternary search tree (TST)—see nodes 52-68—wherein each record 70 comprises a plurality of fields 72-82. The ternary search tree (also referred to by reference numeral 50 for convenience) represents multiple word n-grams. The TST 50 is a "ternary" search tree because a given node may have up to three children. In keeping with terminology for TSTs, the child nodes in FIG. 1 are labeled "low" (or lo-child), "high" (or hi-child), and "equal" (or eq-child). It will be appreciated that a practical TST according to the present disclosure may have a very large number of nodes, e.g., millions or billions of nodes.

At least some of the word-grams represented by the TST 50 of FIG. 1 comprise a sequence of units. The units can be for example, the characters (letters) of an n-gram. For instance, in the 2-gram "the dog" the letters t, h, e, d, o, g can be units of the n-gram. A unit can also be single-byte (1-byte) value in some examples.

FIG. 1 also illustrates a record 70 for a particular node 64. Each node in the TST 50 has associated with it a record 70. The plurality of fields 72-82 of the record 70 for a given node includes a first field 72 or identifying a given unit of the sequence of units for the given node (e.g., the character value for "t"), a second field 80 reserved for storing payload information for the given node, and plural child fields 72-76) reserved for storing information for a first child node (e.g., 64), a second child node (e.g., 66) and an third child node (e.g., 68) of a given node (e.g., 58). Each of the plural child fields 74-78 can store either a null value indicating the absence of an associated child node (in which case there would be no corresponding child node illustrated in the drawing—see the "null" indicators in FIG. 1), or an identifier identifying a memory location of the respective child node. This memory location could be a memory location of a first computer memory (e.g., in RAM) that stores the records for other nodes of the data structure, or it could be a memory location of a separate and distinct second computer memory (e.g., hard disk or flash memory) that is different from the first computer memory. As will be explained elsewhere herein, for at least one record 70 of the data structure 50, at least one of said plural child fields stores an identifier identifying a memory location of another computer memory (e.g, a separate and distinct second computer memory) different than the first computer memory. This can permit ease and efficiency of accessing records for other nodes while maintaining manageable storage requirements for the computer system being used. The record 70 also includes a field 82 for secondary memory identifier, which is an identifier of a memory location in a second memory where a given node's counterpart is found in the second memory. The counterpart carries the same kind of information that the given node carries, e.g., the identity of the unit, information about children and possibly payload data. However, this information may be stored differently for the counterpart node in the second memory. On a more abstract level, the counterpart also represents the 'same' given node in the sense that they are instantiations of same node in different memories.

Whereas record 70 includes three fields for child nodes, a different number could be used. For instance, record 70 could include 6 total fields for the 3 child nodes, each child node having two fields associated with it—one field that can contain an identifier (e.g., pointer) identifying the memory location in the first memory where the record for that child resides, and another field that can contain an identifier (e.g. offset) for identifying the memory location in the second memory where the record for that same child resides.

Figure 2A:
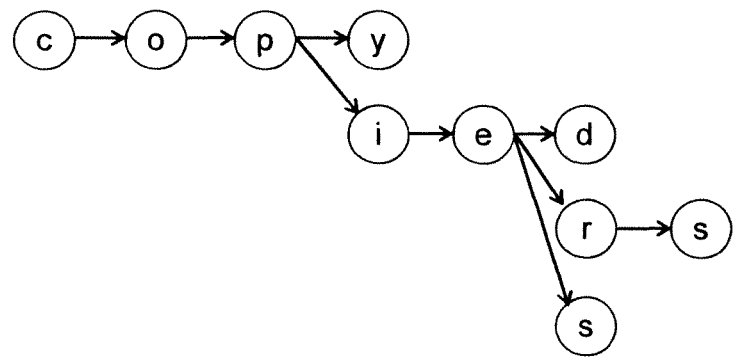
FIG. 2A schematically illustrates a character level tree for a set of words according to an example.
Figure 2B:
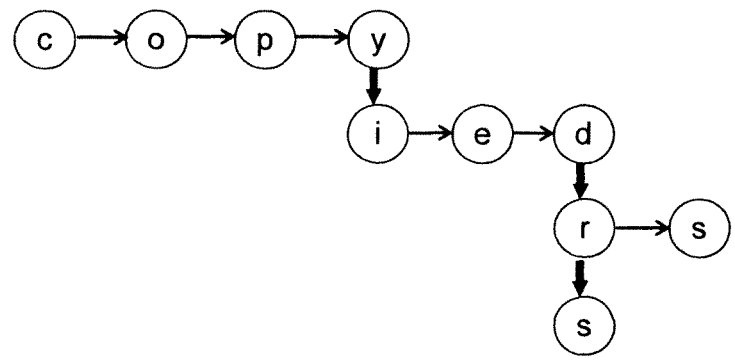
FIG. 2B schematically illustrates the tree of FIG. 2A as a linked-list data structure according to an example.

Conventional wisdom is to use word-level granularity for tree-based word n-gram models, because it is considered to be more memory-efficient, especially when words are represented with numeric IDs. The present inventor notes, however, that more sharing of common prefixes is possible with character symbols (or units) instead of word-level symbols (or units). According to some examples of the present disclosure, character level symbols for word n-grams can be used for implementing exemplary data structures instead of using word-level symbols. FIG. 2A schematically illustrates a character level tree for a set of words according to an example. FIG. 2B schematically illustrates the tree of FIG. 2A as a linked-list data structure according to an example. The narrow arrows in FIGS. 2A and 2B represent "syntagmatic" links, and the bold (thick) arrows in FIG. 2B represent "alternative" links. Both FIG. 2A and FIG. 2B illustrate how character level granularity in the tree structure can be used to represent several different words: copy, copied, copies, copier, and copiers. With character level encoding for word n-grams, it is beneficial to explicitly encode inter-word delimiters (e.g., the "_" symbol can be used, for instance), and with adequate compression described elsewhere herein, an efficient and flexible character level tree for large word n-gram models is practical and beneficial. The present disclosure is not limited to character level encoding, however. For instance, a one byte per node correspondence for the unit represented by the node is another example.

Figure 3:
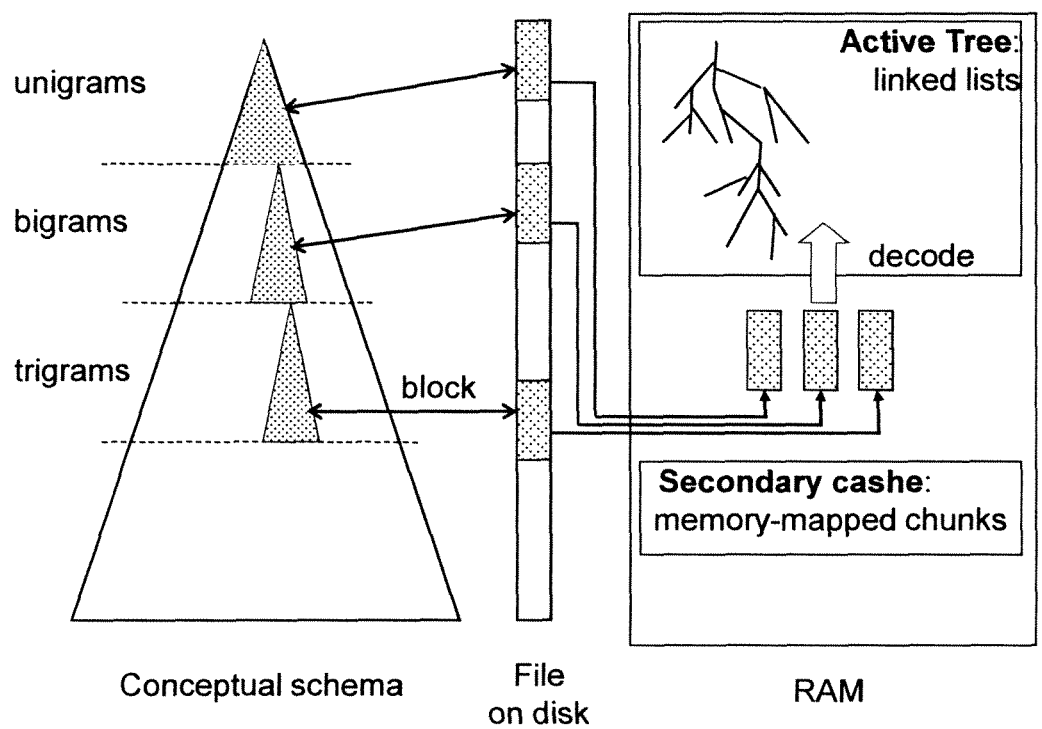
FIG. 3 schematically illustrates an exemplary architecture of a word n-gram tree according to an example.

FIG. 3 schematically illustrates an exemplary architecture of a word n-gram tree according to an example. Conceptually, the whole tree for a large n-gram model is a tree of linked nodes, with a single root. And, conceptually, each node can represent one character (though as noted above, other examples of encoding are possible, such as one byte for the unit represented by the node, for instance). The left side of FIG. 3 represents a TST according to the present disclosure, where the shaded triangles represent sub-trees. Unigrams, bigrams, trigrams, and other n-grams may reside in different portions of the tree, for example. As shown in FIG. 3, the tree can be represented in RAM (e.g., first memory) via an active tree implemented with linked lists. And the TST can also be represented in a file on a disk or other memory (e.g., second memory) that is separate and distinct from the first memory. Memory mappings (identifiers that identify memory locations, e.g., pointers, offsets, for instance), such as explained above in connection with FIG. 1, can provide a suitable mapping between the representations in the two different memories.

According to one example, only a small portion of the tree needs to be active in the first memory at any time ("Active Tree" in FIG. 3). The whole tree is also stored on disk (or other memory) in a serialized compressed fault. The whole file, or portions of it, can be loaded into memory (for example, via memory-mapping), and only relevant parts of the loaded chunks are unfolded (decompressed) into a mutable linked-nodes structure, a process that is automatically guided by the tree search algorithm as described herein. Where child nodes are "nulls", the associated records for those children do not need to be stored in serialized form, and this can save memory space.

The use of an uncompressed mutable data structure in the Active Tree has several advantages. Many searches will follow the same prefix paths, and keeping those paths in memory allows faster search than uncompressing them for each query. Also, with mutable linked lists, parts of the Active Tree can be dropped—thus allowing programmatic regulation of memory loads. A third advantage is that data in the Active Tree can be easily updated (e.g., adding new n-grams) without needing to recompile the entire data structure. Thus, when needed, the same encoded n-gram model can be used in read/write mode.

Figure 4:
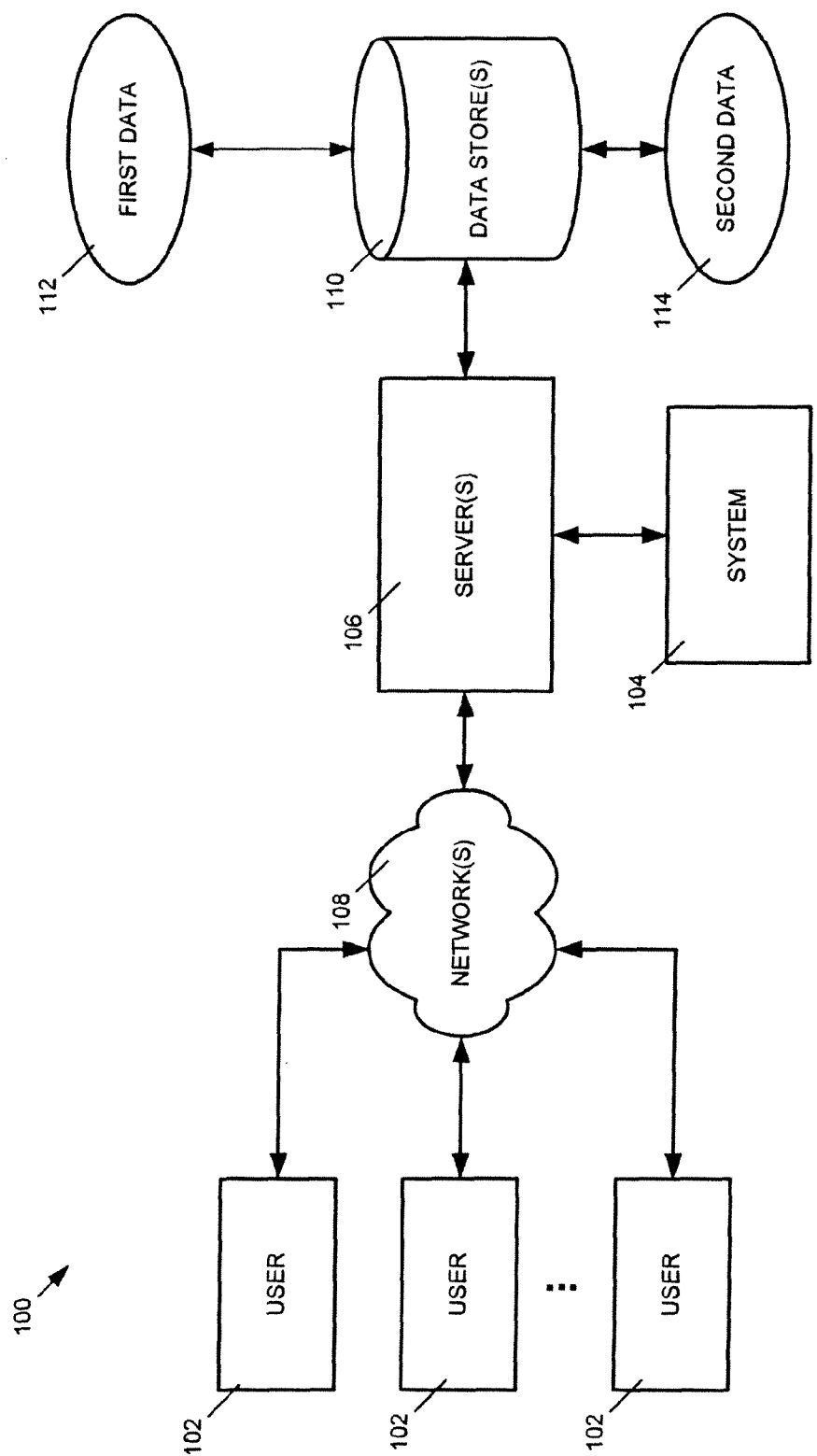
FIG. 4 show a block diagram of an exemplary computer-implemented environment for executing exemplary approaches described herein

A description of exemplary underlying computer systems on which the present approaches may be implemented will now be described. FIG. 4 depicts at 100 an exemplary computer-implemented environment wherein users 102 can interact with a system 104 hosted on one or more servers 106 through a network 108. The system 104 contains software operations or routines. The users 102 can interact with the system 104 through a number of ways, such as over one or more networks 108. One or more servers 106 accessible through the network(s) 108 can host system 104. It should be understood that the system 104 could also be provided on a stand-alone computer for access by a user. The one or more servers 106 may access one or more data stores 110. The one or more data stores 110 may contain first data 112 (e.g., which stores a portion of a serialized version of the TST data structure) as well as second data 114 (e.g., which stores another portion of the serialized version of the TST data structure or which stores a serialized version of a different TST data structure). In some examples, a query can be initiated by a user, or the system can work without human users initiating queries, e.g., queries could be invoked by automatic processes running in some computing environment, such as in an embedded device.

Figure 5A:
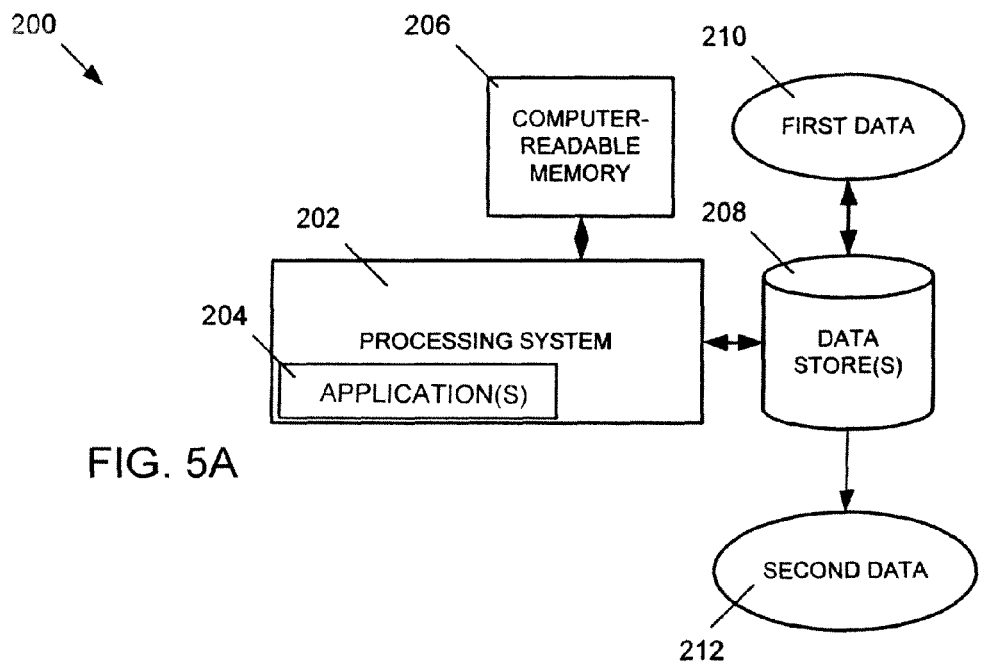
FIGS. 5A, 5B and 5C show block diagrams of exemplary computer-implemented systems for carrying out exemplary approaches described herein.
Figure 5B:
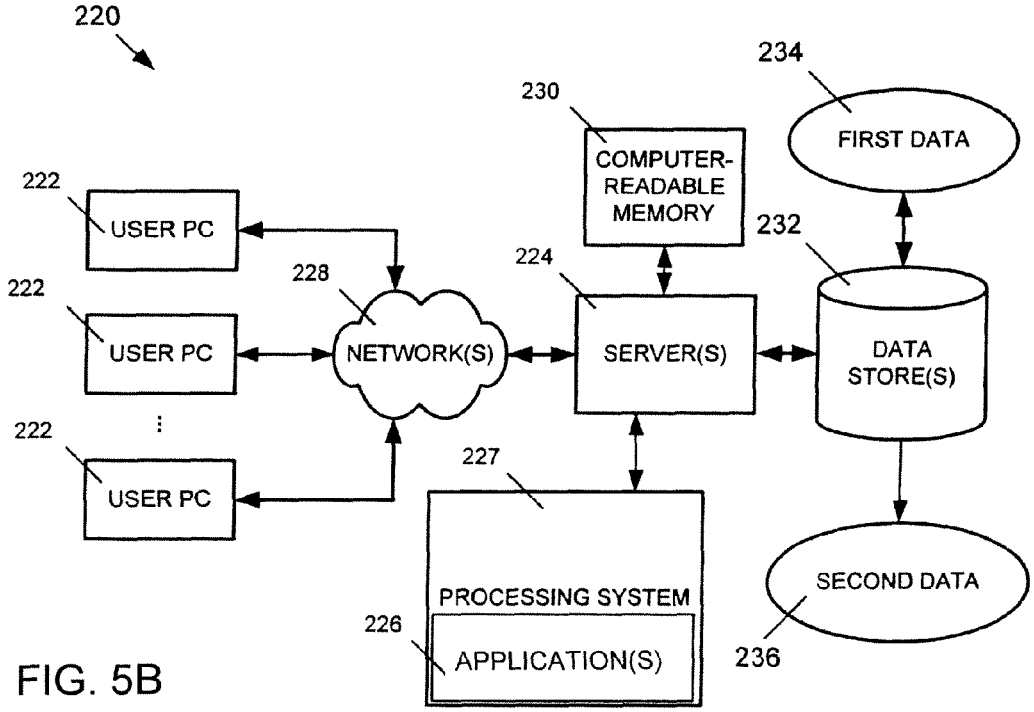
Figure 5C:
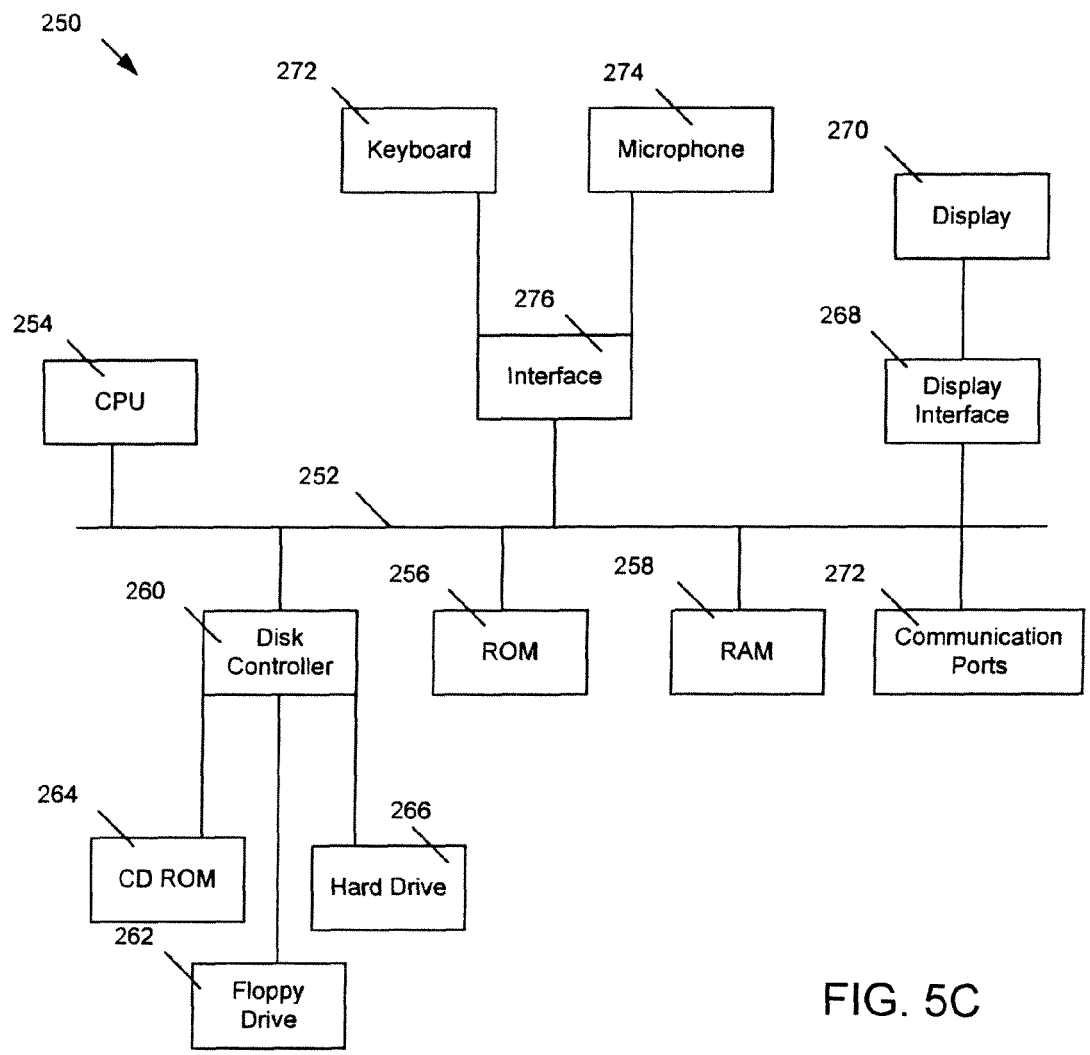

FIGS. 5A, 5B, and 5C depict example systems for use in implementing exemplary approaches described herein. For example, FIG. 5A depicts an exemplary system 200 that includes a stand alone computer architecture where a processing system 202 (e.g., one or more computer processors) includes one or more applications 204 being executed on it. The processing system 202 has access to a computer-readable memory 206 in addition to one or more data stores 208. The one or more data stores 208 may contain first data 210 (e.g., which stores a portion of a serialized version of the TST data structure) as well as second data 212 (e.g., which stores another portion of the serialized version of the TST data structure or which stores a serialized version of a different TST data structure).

FIG. 5B depicts a system 220 that includes a client-server architecture. One or more user personal computers (PCs) 222 can access one or more servers 224 running one or more applications 226 on a processing system 227 via one or more networks 228. The one or more servers 224 may access a computer readable memory 230 (e.g., which may store programming instructions which when loaded and executed can cause the processing system 227 to execute methods disclosed herein) as well as one or more data stores 232. The one or more data stores 232 may contain first data 234 (e.g., which stores a portion of a serialized version of the TST data structure) as well as second data 236 (e.g., which stores another portion of the serialized version of the TST data structure or which stores a serialized version of a different TST data structure).

FIG. 5C shows a block diagram of exemplary hardware for a stand alone computer architecture 250, such as the architecture depicted in FIG. 5A, that may be used to contain and/or implement the program instructions of system embodiments of the present disclosure. A bus 252 may serve as the information highway interconnecting the other illustrated components of the hardware. A processing system 254 labeled CPU (central processing unit) (e.g., one or more computer processors), may perform calculations and logic operations required to execute a program. A non-transitory computer-readable storage medium, such as read only memory (ROM) 256 and random access memory (RAM) 258, may be in communication with the processing system 254 and may contain one or more programming instructions. Optionally, program instructions may be stored on a non-transitory computer readable storage medium such as a magnetic disk, optical disk, recordable memory device, flash memory, or other physical storage medium. Computer instructions may also be communicated via a communications signal, or a modulated carrier wave and stored via a non-transitory computer readable storage medium, such as RAM, ROM, disk, flash memory, or other type of physical memory that is non-transitory.

A disk controller 260 interfaces one or more optional disk drives to the system bus 252. These disk drives may be external or internal floppy disk drives such as 262, external or internal CD-ROM, CD-R, CD-RW or DVD drives such as 264, or external or internal hard drives 266. As indicated previously, these various disk drives and disk controllers are optional devices. Each of the element managers, real-time data buffer, conveyors, file input processor, database index shared access memory loader, reference data buffer and data managers may include a software application stored in one or more of the disk drives connected to the disk controller 260, the ROM 256 and/or the RAM 258, or other memory such as flash memory, for instance. Preferably, the processor 254 may access each component as required.

A display interface 268 may permit information from the bus 256 to be displayed on a display 270 in audio, graphic, or alphanumeric format. Communication with external devices may optionally occur using various communication ports 272. In addition to the standard computer-type components, the hardware may also include data input devices, such as a keyboard 272, or other input device 274, such as a microphone, remote control, pointer, mouse and/or joystick.

Exemplary Node Structure and Search

For a character-level tree, a simple linked-list implementation for each node may have two links, for example: a syntagmatic link (next character in sequence) and 'alternative' link (next character in list, see FIG. 2B). In accordance with the present disclosure, a TST data structure is used, which promotes fast searches. In a TST, each node may have up to three children, rather than two, and the inter-node linking structure is analogous to alphabetically sorted order. The present TST search compares (by numeric value) the current character in the search string with the character at the node. If the search character is less, the search branches into a child that has a lesser char-value ('lo-child'), if the search character is greater, the search branches to the child that has a higher char-value ('hi-child'). When the search character is equal (a match), the search goes to the 'equal child' (syntagmatic link), and proceeds to the next character in the search string. (The 'equal child' may also be referred to herein as a "next child.") This provides a very efficient search strategy, with search time linear in the length of the search key.

A method to efficiently load portions of the TST from serialized form will now be described. Unidirectional linking can be used, so any child-node is logically accessible only from its parent node. In the Active Tree, a node has a hybrid structure (see Table 1 below and FIG. 1)—it has in-memory references to its children, and also carries the values of children's offsets in the serialized data structure (e.g. on disk). This hybrid structure is the key for flexibility. Such as noted with FIG. 1, whereas Table 1 includes three fields for child nodes, a different number could be used. For instance, 6 total fields could be reserved for the 3 child nodes, each child node having two fields associated with it—one field that can contain an identifier (e.g., pointer) identifying the memory location in the first memory where the record for that child resides, and another field that can contain an identifier (e.g. offset) for identifying the memory location in the second memory where the record for that same child resides.

When a node is loaded into Active Tree, it carries the offset values of its children. Any child-node, when requested for the first time, is loaded by offset value. Upon loading a child, the parent node drops the child's offset value and stores a pointer to child-node. When a child is unloaded, the parent will store the child-offset value again—this allows reloading a child when necessary. The offset of the root node is kept in the header of the tree file, and the root node is always the first one loaded. Any other nodes are loaded into Active Tree only when required by the search process.

TABLE 1

Fields for a mutable hybrid TST node.

| Field | Value |
| --- | --- |
| node char ID | identifier for symbol that node represents, e.g., 1 byte |
| equal child (next child) | null, or identifier identifying node location in $1^{st}$ or $2^{nd}$ memory, e.g., 64-bit integer |
| hi-child | null, or identifier identifying node location in $1^{st}$ or $2^{nd}$ memory, e.g., 64-bit integer |
| lo-child | null, or identifier identifying node location in $1^{st}$ or $2^{nd}$ memory, e.g., 64-bit integer |
| payload data | null, or statistical data, e.g., n-gram count (or a structure for complex data), e.g., 64-bit integer |
| secondary memory identifier | identifier of memory location in secondary memory where node counterpart is found, e.g., 64-bit integer |

Count and Probability Values

Useful core data associated with every n-gram in a model is the count (whole integers) or probability (floating-point numbers) of a given n-gram. The advantage of counts is that they are easily and locally updatable. An exemplary implementation stores a count value for every n-gram. Cumulative counts are maintained for each n-gram order (e.g. 1-5, or higher) and are stored in the file header. Fractional probability values, when required, can be computed on the fly during query processing. This design allows easy encoding of existing tabulated n-gram collections and also generation/update of n-gram models from text.

Serialized Data Structure and Compression

The serialized structure of a single node derives from the TST node structure described above. Essentially, one can serialize a linked-list structure where each node may have up to three links to children. Links can be represented by offset values (for identifying a location in memory). Thus, for each node, the system can store node ID (e.g. character value), offset values of its children and the associated data, such as count value, though more complex data can also be used. All nodes can be encoded, for example, in post-order (meaning that children are encoded before parents) into a continuous sequence of records on disk. For very large n-gram models, the resulting sequence may take several gigabytes (even with compression), and hence the system can use 64-bit offset values.

TABLE 2

Serialized record structure for a TST node.

| | Content | Size | Status |
| --- | --- | --- | --- |
| 1 | indicator flag | 1 byte | mandatory |
| 2 | character value | 1 byte | mandatory |
| 3 | next-child offset | 1-8 bytes | optional |
| 4 | hi-child offset | 1-8 bytes | optional |
| 5 | lo-child offset | 1-8 bytes | optional |
| 6 | data flag | 1 byte | optional |
| 7 | data value | 1-8 bytes+ | optional |

Compression can be used to minimize the overall file size, and to keep the memory-mapped portions small. For pinpoint activation, each record is compressed separately, independently of other records. Compression is optional (serialization could be done without compression), but highly desirable. If compression is done, then every node is compressed separately. The record length is variable. Only two fields are mandatory—an indicator flag and character id (1-byte each). Child offset values are encoded only for children that actually exist (no space is reserved for potential children). Coding takes two steps. First, delta compression is used—encode only the differences between node's own offset and the children's offsets. Next, variable length encoding of integers is used. However, instead of varying on the bit-level, or using representation in base-128, the core byte-level numeric types can be used as afforded by the programming language (i.e. 1-/2-/4- or 8-byte integers) and specify the field lengths in the indicator flag. The single-byte indicator flag indicates several things at once: how many children there are, their roles (hi/lo/next), how many bytes are used to encode each value, and whether the node carries any data or not. This overloading can be achieved by using 250 pre-arranged fixed values, while six more values are reserved for special cases. If data is present, an additional 1-byte indicator flag is used (which signifies the data type and how many bytes are used), followed by a variable-length encoded count value. When necessary, more complex associated data can be stored in a similar manner.

Updateability and Optimization

When working in updateable mode, counts for stored n-grams may change and new n-grams may be added, thus introducing new nodes and new children for existing nodes in the tree. In the present disclosure, all changes can always occur in the mutable Active Tree in memory. Serialization works in two steps: a) basic update and b) optional later optimization.

Exemplary basic update works as follows. Both new nodes and affected-old-nodes are compressed and serialized individually, as described above. Records for new nodes are appended at the end of the file. Updated old nodes rarely can fit into their old tight places in the file. A simple 'hop-trace' solution is used: store an old node in a new location at end of file and overwrite the record in old location, leaving a 'hop-trace'. A hop-trace includes two components: a flag value indicating that the data is a 'hop' offset, and an offset value to the new location. When n-gram collection grows very big, 'hop' offsets may need 64-bit integer values. Since an 'old' location is often just 3-4 bytes long, in many cases it cannot store a hop-trace. To ensure that any record can be overwritten with a 'hop trace', a record must have minimal size. Thus, the same serialization format is used in two modes: padded and unpadded. The padded format differs in that any record that is too small after compression is padded with empty bytes, up to a minimal required size. A serialized file with 'hop-traces' is fully operational for literal and wildcard n-gram searches, and for further updating.

For exemplary optimization, the system includes a compaction process that recodes a whole file (tree) and eliminates hop-traces. The compaction process can also add or remove record padding. Conversion between padded and unpadded formats is simple, always available, and is very fast. Notably, a file is updateable even after optimization.

With this design, incremental encoding of existing tabulated collections and collection from running text (i.e., text documents, as opposed to tabulated and prearranged n-grams) is essentially the same process, with just different methods for reading source data.

Loading by Offsets and Memory Mapping

According to exemplary approaches, decompression of a node does not depend on other nodes. Any node can be individually found in the serialized sequence, by offset value, and quickly decompressed. Depending on memory utilization policy, the whole serialized sequence, or parts of it, can be memory-mapped and kept in RAM (as Secondary Cache), for fast decompression. This section describes how partial on-demand loading is facilitated.

A block of immediate successor words for a given word can be a natural and efficient unit for on-demand loading. With a character-level tree, a block of successor words is actually a sub-tree (see, e.g., FIG. 3). Sub-trees corresponding to successor-blocks can be automatically identified during compaction-optimization stage of encoding. For each block, nodes can be serialized and compressed individually, in post-order, with an additional provision: they are grouped together and saved as a contiguous sequence in the tree file. For on-demand loading, the start- and end-of-block offset values are stored in the record of the inter-word delimiter character (the root of the sub-tree).

In on-demand loading mode, efficient loading of blocks is done in the following manner. When the search algorithm encounters an inter-word delimiter in Active Tree, a file-chunk (the serialized sub-tree) is memory-mapped and is then ready for fast pinpoint decompression of individual nodes. There is no need to decompress all of the nodes in a block—only those that are specified by the search process. A Secondary Cache manages all memory-mapped chunks. To optimize memory usage, it tracks the 'usefulness' of on-demand-loaded chunks and unloads chunks that are not used for a while. Note that dropping a sub-tree from Active Tree is not the same as dropping a memory-mapped chunk from Secondary Cache. The two complementary components have separate memory policies that contribute to overall system flexibility.

Word Recoding and Byte-Level Granularity

A character-level tree can be made significantly smaller by recoding all words into shorter code words. During model encoding, all unigrams are sorted and assigned with integer IDs in decreasing order of frequency (i.e. static pseudo-Huffman coding). Numeric codes are then converted into base-254 byte sequences. The 254 most frequent words are coded as 1-byte code words, the next 64516 most frequent words are assigned 2-byte code words. More than 16 million additional words can be encoded as 3-byte sequences, which is enough to cover a reasonable natural language vocabulary. For example, an n-gram like 'exert_considerable_effort' may be converted into a much shorter sequence like '56x_z8H_b7'. Base-254 is used rather than 256 since a one byte value is reserved for inter-word delimiter '_', and one additional value is reserved for special uses.

Exemplary algorithms according to the present disclosure for search, serialization and compression work with nodes that have byte-value identities. The structure can have byte-level granularity. This allows uniform treatment of words or code words—both kinds are treated as sequences of byte-valued nodes.

In practice, the first word of any n-gram is not recoded. Thus, the layer of unigrams in a tree also serves as a dictionary for translating words into code words. Unigrams are encoded as sequences of nodes where each node carries one-character byte-value. A node that encodes the last byte of a unigram carries a complex associated data structure, which includes the unigram frequency (count) and the associated code word byte sequence. When the system is queried about any given literal n-gram, it searches each word separately, as a unigram, and attempts to retrieve code words for each word of the query (except first). If this step is unsuccessful, the n-gram is not in the model and the search quickly terminates. Otherwise, a code-worded n-gram equivalent (byte-sequence) is assembled and searched for in the tree. Although a recoding step takes time for each query, it allows fast rejections and shorter searches in the tree.

Wildcard Queries

This section describes how wildcard searches can be supported on the core tree structure without any additional indexes. With literal n-gram queries, the related questions are 'is this word-sequence in the database?' and "what is its count/frequency?'. With wildcard queries, there is usually a need to retrieve n-gram strings as well. Iteration over index keys is a principled integral feature for prefix-trees. Since the system can store codeword byte-sequences, it needs to be able to convert them back to word strings. The layer of unigrams serves as a dictionary from words to code words, and there is an inverse dictionary from code words to words. This dictionary is stored as a separate tree in the same serialized format, in the same file as the core tree, and uses the same load and search methods. The inverse dictionary has the same number of entries as the unigram layer in the core tree. The inverse dictionary is automatically updated whenever the unigram layer is updated.

Exemplary implementations support two familiar wildcards: '?' and '*'. The question mark stands for any character. When used alone, the asterisk stands for any single word. When used in a pattern with letters and '?', the asterisk stands for any sequence of zero or more characters. For example, a query "a_g?*_*" would retrieve all and only trigrams where the first word is 'a', the second word starts with two letters, of which the first must be 'g', the third word may be any word (query matches e.g. 'a_good_day'). Interpreting a wildcard query involves counting the number of components (separated by blanks or '_'). Each component is either a literal word or a wildcarded pattern. Wildcarded patterns are translated into regular expressions. Search in the tree is recursive, with backtracking, starting with the first query-component. The search process iterates on the tree, generating candidates and filtering them against the query.

The query "a_g?*_*" starts with a literal component. If the first word is found among the unigrams, the set of its successors (code words) is pinpointed by a single address and can be loaded from a tree file to the secondary cache, and searched exhaustively. Each candidate code word (a byte-sequence) is converted into a word (via the reverse dictionary), and if the word matches the regular expression, it is a viable candidate. The node for the last byte of the candidate byte-sequence holds the offset for loading the block of next successors—that block is there candidates are sought for the next component of the query. If a candidate byte-sequence is found there, and its corresponding word is matched by the regular expression, it is a global match for the query. The frequency count of the n-gram is in the very last node of the retrieved sequence. To find a next global match, the system tries to find a next match for the last candidate component, '*'. Upon exhausting all candidates for the last word (given the current state of candidates for all preceding components of the query), the system backtracks to the handler of the previous candidate component, '*d'. The block of (depth 3) successors that has been just exhausted is not needed anymore and may be unloaded from memory. If another candidate is found for the second component, a block of successors is loaded and searched. Eventually, the system backtracks to the first word/component and the search is exhausted. If the first component is not a literal but pattern, the recursion-backtracking process is repeated until backtracking reaches the root node. Handling of literal components is simpler. All literal components of a query (except the first) are recoded into codeword byte-sequences. In any respective position on the tree, instead of searching a block of successors, only a single byte-sequence is sought. Complex wildcarded queries are served with very little memory load, due to unloading of blocks upon backtracking.

Exemplary Flow for Populating a Data Structure

Figure 6:
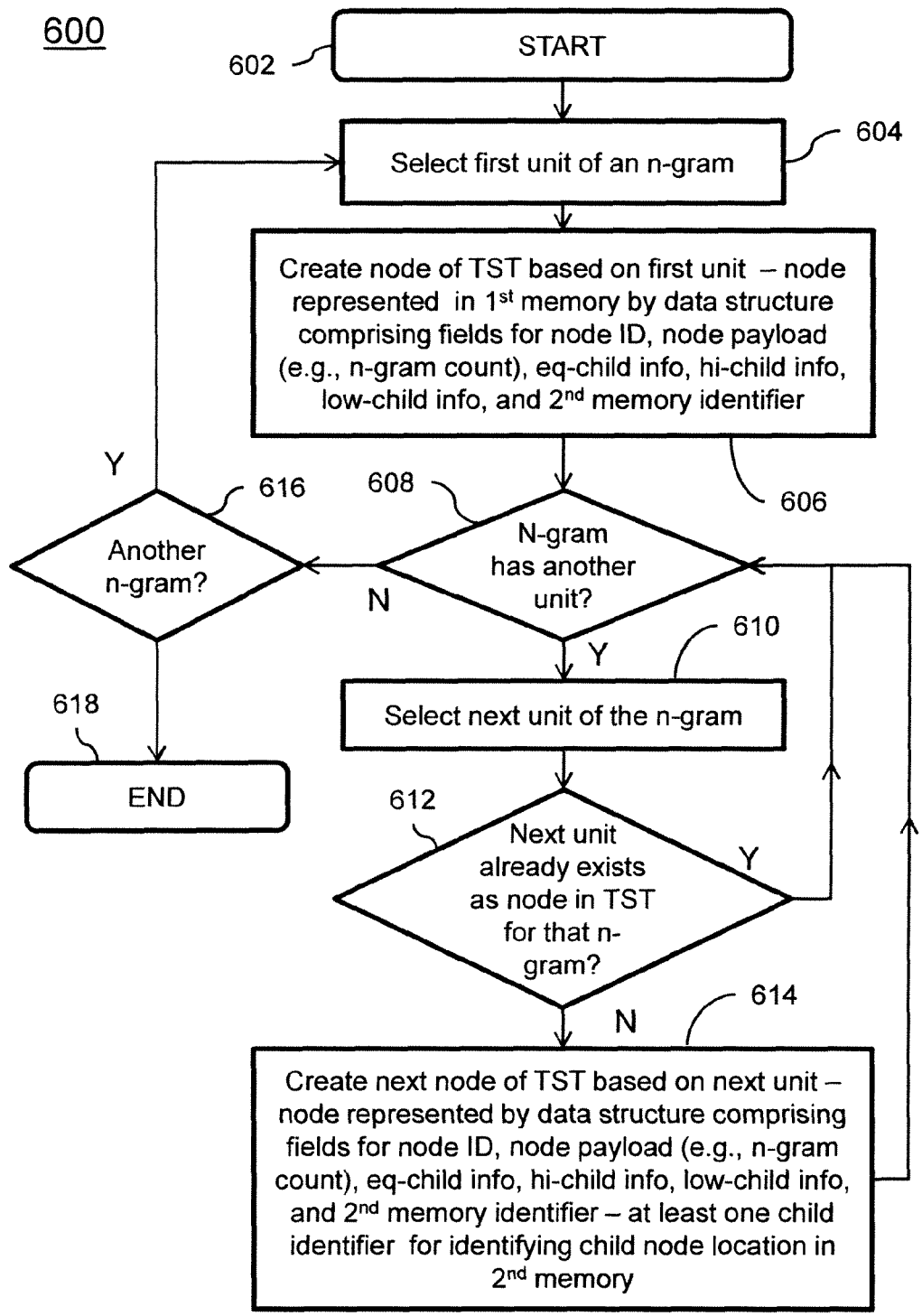
FIG. 6 illustrates a flow diagram for an exemplary approach for populating a data structure for a ternary search tree representing word n-grams according to an example.

An exemplary approach for populating a data structure according to the present disclosure will now be described. FIG. 6 illustrates flow diagram for an exemplary method 600 for populating a data structure as described herein. The method can be implemented using any suitable computer system such as explained herein in connection with the non-limiting examples of FIGS. 4, 5A, 5B, and 5C. As an initial matter, the fields for the data structure can be defined using any suitable approach or computer language as will be appreciated by those skilled in the art in light of the teachings herein. Having been defined, the data structure can then be populated.

As an initial matter, the data structure can be populated from an existing index of n-grams, and various such indices are known to those of ordinary skill in the art. Or, the data structure can be populated by first parsing a corpus of documents to identify various n-grams to generate an index and then populate the data structure. Or the data structure could be populated "on the fly" while parsing a corpus of documents by keeping a running count of the n-gram statistics as they develop and updating those statistics in the data structure. In any case, it may be desirable to "clean" (or "filter") the starting index to remove any sequences and characters that are not desired, e.g., certain punctuation, URL addresses etc.

The method starts at step 602, and at step 604 a processing system (e.g., 104, 202, 227, 254) selects a first unit of a desired n-gram. The unit can be, for example, a character or a 1-byte unit, for instance, or any other suitable unit of the n-gram. At step 606, the processing system creates a node of the TST based on the first unit starting with the root node or another node. The node is represented in a first memory, such as RAM, by a data structure comprising fields for: node ID, node payload (e.g., n-gram count), eq-child info, hi-child info, low-child info, and second memory identifier (which identifies the memory location of the present node's own counterpart in the second memory). During population, when a new node is created, it does not yet have a serialized counterpart, and the initial value is null or some value that indicates lack of valid value (e.g., zero). After serialization, an actual value for counterpart pointer is obtained.

At step 608, the processing system determines whether the current n-gram has another unit. If the current n-gram does have another unit, that unit is then selected. At step, 612 the system determines whether the next unit already exists as a node in the TST for that n-gram. If it does not already exist, at step 614, the system creates the next node of the TST based on the next unit. That next node is likewise represented by a data structure record comprising fields for: node ID, node payload (e.g., n-gram count), eq-child info, hi-child info, low-child info, and 2nd memory identifier.

If at step 612, it is instead determined that the next unit that had been selected already existed in the TST for that n-gram, then the process returns to step 608. And, if, during an earlier portion of the process, it is determined at step 608 that the current n-gram does not have another unit, the process proceeds to step 616, where it is determined whether another n-gram should be processed (e.g., whether n-grams remain or whether some other step condition has occurred.) If no other n-grams are to be processed, the process ends at step 618. Otherwise the process returns to step 604 to select a first unit of another n-gram.

In this way, a TST of many nodes can be populated. Also, the data structure is populated such that at least one child identifier identifies a child node memory location in the second memory (different from the first memory where the data structure resides). Thus, for example, as noted previously, the entire data structure does not need to be loaded into RAM but can efficiently access other portions of the data structure from hard disk or other memory.

Also, one-grams, 2-grams, 3-grams, 4-grams, 5-grams, and higher order grams can be generated, and these can be suitably stored in a tree structure in any desired form of memory, e.g., that is indexed by the n-value of the n-gram so as to permit ease of navigating to the proper n-level of the database when searching n-grams.

Also, as explained, each record representing a node of the ternary search tree can be individually compressed. The data structure can be configured such that new records representing new nodes of the ternary search tree can be added to the data structure to thereby update the data structure without recompiling the entire data structure. Also, as explained, the data structure can be configured to support wildcard searches of the data structure without the use of any additional indexing specially designed to facilitate wildcard queries. In addition, the payload information can comprise statistical information related to a count for a particular word n-gram, and this information can be obtained from an existing n-gram collection, or it can be generated from a corpus using techniques known to those skilled in the art.

Exemplary Flow for Searching a Data Structure

Figure 7:
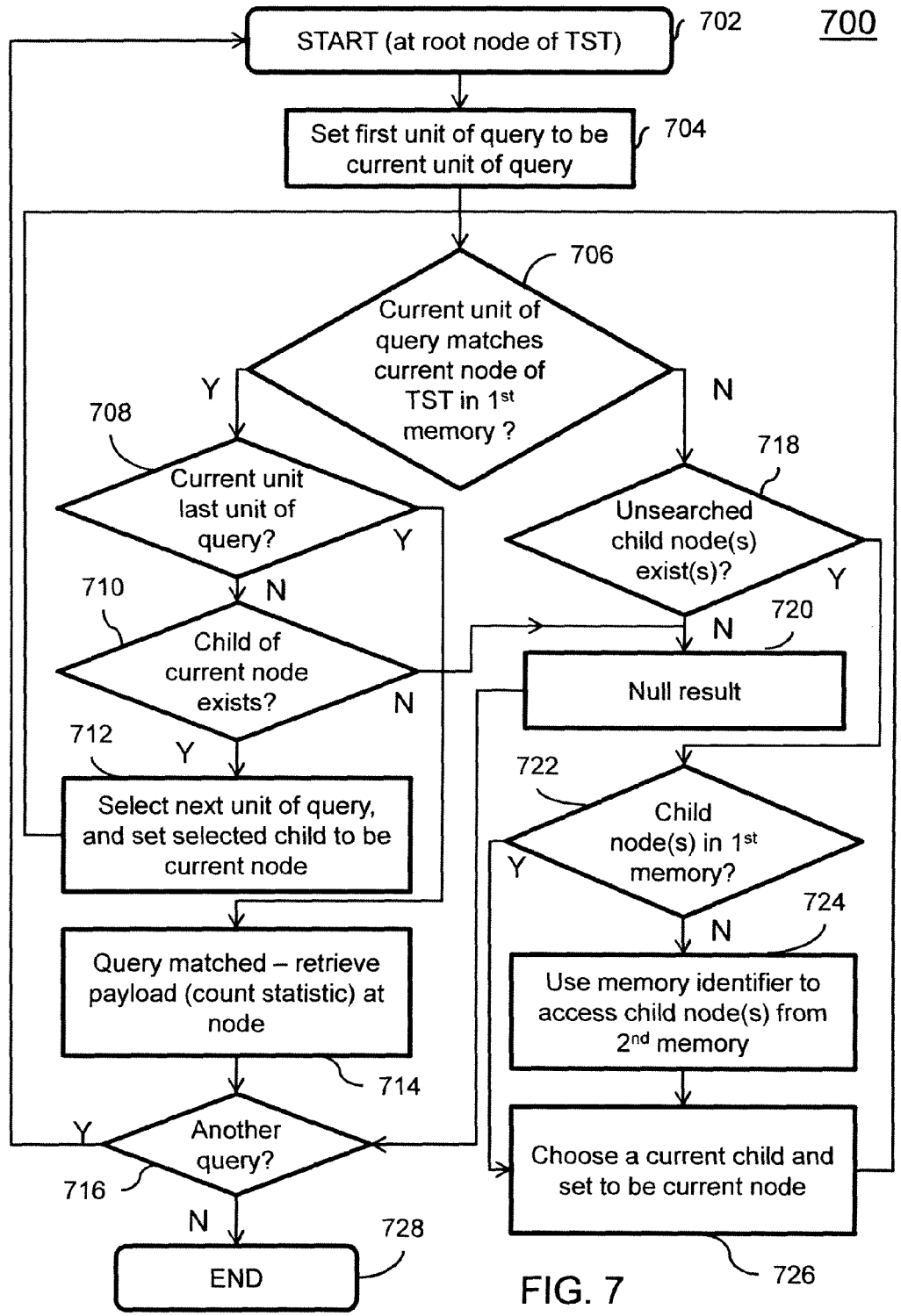
FIG. 7 illustrates a flow diagram for an exemplary approach for searching a data structure for a ternary search tree representing word n-grams according to an example.

An exemplary approach for searching a data structure according to the present disclosure will now be described. FIG. 7 illustrates flow diagram for an exemplary method 700 for searching a data structure as described herein. The method can be implemented using any suitable computer system such as explained herein in connection with the non-limiting examples of FIGS. 4, 5A, 5B, and 5C.

The method starts (at the root node) at step 702. Given a query, e.g., either generated by a user, received from some other source, or otherwise selected for instance, the processing system at step 704 sets the first unit of the query to be the current unit of the query. As noted previously, such a unit can be a character (e.g., letter of a word), a 1-byte value representing a part of an encoding of a word, or some other unit. At step 706, the system determines whether the current unit of query matches current node of the TST represented by records that reside in the first memory. If there is no match, the process proceeds to step 718, at which point the system determines whether there are any unsearched child nodes (i.e., previously unsearched for the purpose of the current node and current unit of the query).

If the process is arriving at step 718 for the first time for a given current node, the system will look for whether the current node (as a parent) has any children. But, if the system arrives back at step 718 after having traversed the right-hand side of FIG. 7 through step 726, the next determination at step 718 will seek to determine whether any sibling nodes remain unsearched, these siblings being siblings of the child that was just selected at step 726 to be the new current node. In other words, the system checks at step 718 whether the current node has children linked as alternative nodes. A node on TST may have 0, 1, or 2 'alternative' nodes. One of them (if it exists) would be marked as 'low-child' and the other (if it exists) would be the 'high-child'. At this point it is known that the current query unit (symbol) does not match the symbol of current node (otherwise the process would not be at step 718). So, the system checks whether the current unit (symbol) is greater than the symbol value on the current node. If it is greater, the system requests the node linked as high-child, and if it is not greater, the system requests the node linked as low-child. In both cases, the process will then proceed to step 726. The comparison of 'greater than' can be typically done by numeric values of the symbols (e.g. ASCII), though other implementations are possible. If there are no unsearched child nodes, a null result is returned at step 720, and the system proceeds to step 716 to determine whether another query should be performed.

If there are unsearched children nodes at step 718, the system determines at step 722 whether the record for such child node resides in the first memory. If yes at step 722, the process proceeds to step 726 to choose the current child node and set it to be the current node. If no at step 722, the system uses the memory identifier stored in the current (parent) node to access the child node (it may lead to other nodes since this process is recursive) from the second memory (e.g., that is separate and distinct from the first memory) before choosing the child node at step 726 to be the current node. The accessing at step 724 could involve, for instance, loading record for the child node from the second memory into the first memory, loading that record info a different (third memory), or otherwise directly accessing information stored in the corresponding record for that child from the second memory.

If the initial determination at step 706 were different, the system would take the left-hand path of FIG. 7 instead of the right-hand path. In particular, if the system determines at step 706 that the current unit of the query matches the current node of the TST in the first memory, the process proceeds to step 708 at which point the system determines whether the current unit of the query is the last unit of the query. If yes at step 708, the process skips to step 714. At step 714, the processing system returns an indication that the query has been matched and retrieves the payload field (e.g., count statistic for that n-gram or some other statistical information or other information, provided that there is a payload (the payload could be null or there could be some other indicator that no data is stored).

If no at step 708, the system determines at step 710 whether a next child (eq-child) of the current node exists (the child might need to be loaded from $2^{nd}$ memory, similarly to steps 722 & 724). If no at step 710, the process proceeds to step 720 (null result) referred to above and continues to step 716 to determine whether there is another query to be done. If yes at step 710, the process continues to step 712 and the system selects a next unit of the query and selects a child node (e.g., the next syntagmatic child) to be the current node, and then returns to step 706 to check for a match. The process then continues as explained until it is decided to execute no further queries at step 716, and the process ends at step 718.

As noted above, the unit (or symbol) of the n-gram can be a character, or a 1-byte value representing a part of an encoding of a word, or some other unit. Also, the query can include one or more wildcard elements (characters), and the step of determining whether the current unit of the query matches a current node of the ternary search tree can be carried out without the use of any additional indexing specially designed to facilitate wildcard queries. Also, the payload information that is returned can comprise statistical information related to a count for a particular word n-gram, such as the count itself or some other measure based on or related to the count, for example, or the payload can be some other type of information. As noted, however, there might be no payload. For example, if the system has stored the n-gram "the dog" with count 5, the sequence "the do" would also be in the database, but would have no count.

According to an example, the method of FIG. 7 can also be used in a method of retrieving documents stored in a suitable database that are responsive to a query. For example, the payload stored in the data structure need not be limited to statistical information regarding a given n-gram. The payload could also include, for instance, one or more memory identifiers (e.g., pointers, offsets) that identify the memory locations of one or more documents that contain the n-gram that is the subject of the query, optionally with any suitable ranking statistic that ranks the relevance of the document to the query, e.g., according to how many times that n-gram is contained in the particular document, for instance. Thus, in this example, when the processing system returns an indication that the query has been matched and retrieves the payload field at step 714, the system can retrieve one or more documents responsive to the query (with ranking if desired) as well as a count statistic or other suitable statistical information for that n-gram, if desired. Additional fields can be provided for the data structure to carry such additional payload information if needed.

According to another example, the method of FIG. 7 can also be used in a method of correcting spelling errors in a document, either automatically or with user assistance. For instance, any suitable spell checker such as conventionally known to those skilled in the art can be used to identify a spelling error in a word sequence, e.g., a spelling error in a sentence. As an example, consider the word sequence w1 w2 w3 w4 w5 w6 w7 w8, where w1 is the first word in the sequence, w2 is the second word in the sequence, and so on, and where a suitable spell checker has determined that the word w5 is misspelled. A data structure containing n-gram information including statistical count and/or frequency information for numerous n-grams (e.g., millions or more n-grams) can be searched using one or more n-gram queries based on portions of the sequence of words using a wildcard in place of the misspelled word (w5) to return candidate matching n-grams, e.g., ranked by count or frequency. Such queries using wildcards can be carried out as described previously herein, for example. For instance, a query w3-w4-wildcard-w6-w7 could be carried out to return ranked matching 5 grams. Alternatively, or in addition, a query w3-w4-wildcard-w6 could be carried out to return ranked matching 4 grams. Alternatively, or in addition to, a query w4-wildcard-w6 could be carried out on the data structure to return ranked matching 3-grams. Of course, even higher order n-gram queries could be carried out, if desired. With the returned matching n-gram candidates being ranked, the misspelled word w5 can be automatically replaced without user selection with the corresponding word from the highest ranking candidate n-gram that was matched (of a desired n-gram order, e.g., n=7, 6, 5, 4, 3, etc.) Alternatively, manual user selection could be used to select the desired replacement word, based on presenting to the user the highest ranking m candidate replacement words in rank order (where m can be chosen based on any preference for the implementation, e.g., m=2, 3, 4, 5, etc.). It will be appreciated that by using a higher-order (as opposed to lower-order) n-gram query in spelling correction as described above, relatively more context information can be utilized to provide better quality spelling correction. For instance, a 6-gram query that uses a wildcard for the misspelled word may provide more context information and may return more relevant n-grams for the particular context than a 2-gram query that uses a wildcard for the misspelled word. Thus, it may be advantageous to carry out the spelling correction using the highest order n-gram query (or several highest order n-gram queries) that return(s) matching results. In this way, high-quality, context-based spelling correction may be obtained.

Empirical Results

An example of the TST data structure implemented with byte-level granularity and with Huffman coding, using a portion of the data structure "active" in RAM while other parts were stored on hard disk for access, was implemented in Java programming language (version 1.6). The implementation can be used as an embedded library in applications, or run from scripts or command line. All results reported in this section were obtained by running the implementation from simple OS-level scripts (bash on Linux and .bat on Windows). Results are reported for several different platforms (or specifications, as referred to herein), namely:

1) Server: Linux kernel 2.6.32 (Fedora), 64 bit, 32 GB RAM, Intel® Xeon®, 8 CPUs, 2.66 GHz, 4 MB cache;
2) Server: Linux kernel 2.6.27 (Fedora), 64-bit, 16 GB RAM, AMD Opteron™ 248, 2 CPUs, 2.20 MHz, 1 MB cache;
3) Server: Linux kernel 2.6.27 (Fedora), 64-bit, 8 GB RAM, AMD Opteron™ 275, 4 CPUs, 3.40 GHz, 1 MB cache;
4) Laptop: Windows 7™, 64-bit, 4 GB RAM, AMD Turion™ II Dual-Core M520, 2.30 GHz, 1 MB cache; and
5) Desktop: Windows XP™ (SP3), 32-bit, 2 GB RAM Intel® Pentium® D, Dual-Core, 3.40 GHz, 2 MB cache.

Encoding: Data and Performance

This section describes encoding of two very large collections of n-grams: the Google Web1T and a collection based on the English Gigaword corpus (Graff and Cieri, 2003). Encoding of the former demonstrates handling of pre-tabulated data, while the latter is an example of generating a large encoded collection of n-grams directly from texts.

The implementation provides configuration settings for filtering of punctuation, digits/numbers and unknown (out-of-vocabulary) words—depending on the settings, each of these can be either accepted, rejected, or encoded as a class (punctuation as '#PUNC', numbers as '#', and unknown words as '#UNK'). All results reported in this paper used the following setting: punctuation accepted, numbers recoded as '#', n-grams containing unknown words were rejected. For practical text processing, the n-gram model was limited with a controlled vocabulary—all single words from WordNet 3.0 and all their inflected variants (multi-word terms were split and parts added as single words), plus English prepositions, pronouns and wh-question words. Additionally, all accepted n-grams are converted to lowercase and identical n-grams are merged (counts summed). With such filtering, about 46 percent of the original Google Web1T data was retained (see Table 3). The resulting file, encoded by the implementation, stores about 1.7 billion unique n-grams. The optimized file size is 12 GB, with an average of 6.95 bytes/n-gram. These numbers pertain to storing just n-gram sequences and counts.

TABLE 3

Original and filtered Google Web1T n-gram counts (unique n-gram types).

| Order | Original count | Retained count | % of original |
|---|---|---|---|
| Unigrams | 13,588,391 | 131078 | 0.96 |
| Bigrams | 314,843,401 | 79,097,446 | 25.1 |
| Trigrams | 977,069,902 | 426,018,101 | 43.6 |
| 4-grams | 1,313,818,354 | 660,502,883 | 50.3 |
| 5-grams | 1,176,470,663 | 586,480,732 | 49.9 |
| Total | 3,795,790,711 | 1,752,230,240 | 46.2 |

During encoding, the implementation makes use of the inherent updateability of its data format. For example, with the Google Web1T data, the unigrams first are encoded, then the bigrams, trigrams, etc. Each time, the system simply updates more data into the compressed format, without recalculating any of the data that is already stored. There is just one single pass over the source data, reading directly from g-zipped original tabulated files, with all filters applied on the fly. A single-threaded process, on a non-dedicated Linux server (specification 1, see above), completed optimized encoding of Web1T collection in about 11 hours, utilizing one CPU and up to 16 GB of RAM.

In generating a language model form the Gigaword text, the same filtering settings were used, but the process here was slightly different. The implementation processed Gigaword data directly from four very large text files (corresponding to the four sections of the Gigaword corpus, in total 4 GB uncompressed), handling them in sequence (no pre-tabulation). Upon opening a text file, the implementation simply defines a window of size n on the text, generates all n-grams of orders 1 to n in the window, applies filters according to settings, and stores the n-grams in Active Tree. It then continues by sliding the window until it reaches the end of file (resetting the window at end of sentence or at end of paragraph, as set by configuration). Millions of new n-gram types (unique sequences) are generated and counts for millions of n-grams are updated continuously. During encoding, the implementation automatically compresses data from Active Tree to Secondary Cache and to disk, and it also moves data in the other direction—when updates are needed for stored n-grams that are no longer in the Active Tree. A single-threaded process on a non-dedicated Linux server (spec. 1) completes generation (with filtering) and optimized encoding of n-grams (orders 1-to-5) for the Gigaword corpus in about 24 hours, using one CPU and up to 20 GB of RAM. The resulting optimized file size is 9 GB, with an average of 7.32 bytes/n-gram. Statistics for the Gigaword n-grams collection are presented in Table 4. Unlike the Web1T data, this data set includes many n-grams with very low counts (e.g., 1). (The producers of GoogleWeb1T filtered out n-grams with words that have low counts.)

TABLE 4

Statistics for n-grams collection generated from the Gigaword corpus.

| Order | Unique n-grams | Total frequency (count) for all n-grams of order n |
|---|---|---|
| Unigrams | 131,079 | 1733857230 |
| Bigrams | 28,294,286 | 1634194914 |
| Trigrams | 185,569,644 | 1542180587 |
| 4-grams | 435,504,974 | 1456577251 |
| 5-grams | 625,928,377 | 1375898638 |
| Total | 1,275,428,360 | |

Overall, the implementation's encoding performance is remarkably fast. With this architecture, generation and/or encoding of very-large n-gram models can be treated as a routine short-term task for a mid-size server.

N-Gram Retrieval Performance

The implementation's n-gram retrieval performance was tested with a massive n-gram computation task. Evaluation runs were conducted with the two encoded language models described in previous section. A text (The Children's Book of Christmas Stories", from Project Gutenberg, available at http://www.gutenberg.org/etext/5061) with 103666 tokens (83592 word tokens and the rest are punctuation tokens) was used. Separate evaluations were run for massive retrieval of 2-grams and of 5-grams: on each run, the text was processed with a 2- or 5-word sliding window. N-gram counts are reported in Table 5. In the evaluation, all n-grams (size n) are generated from the text, and for each n-gram the system seeks the count value in database (each generated n-gram is a query).

TABLE 5

N-gram counts for the retrieval evaluation task.
Percent values in parentheses are relative to respective "count in text" values.

|  | 2-grams | | 5-grams | |
| --- | --- | --- | --- | --- |
|  | Tokens | Types | Tokens | Types |
| Count in text: | 103665 | 44358 | 103662 | 99949 |
| Found in TS-GigaWord | 89312 (86.2%) | 38382 (86.5%) | 12919 (12.5%) | 12232 (12.2%) |
| Found in TS-Web1T | 90575 (87.4%) | 40054 (90.3%) | 23253 (22.4%) | 21983 (22%) |

("TS-GigaWord" refers to an n-gram database generated from GigaWord, and similarly TS-Web1T.)

Memory use and search times were measured for two different load options—on-demand loading and whole-file loading (the same database loads in different modes on different occasions, controlled by an option switch). On-demand loading was tested in two conditions—'cold' start (with empty OS-caches, all data read from disk) and 'warm' start (a separate run after completing a cold-start run, some OS-caches are reused). All runs were conducted on the same Linux server (spec. 1). For each condition, timing values were averaged across four separate runs. Results are given in Table 6.

Full loading and on-demand loading are two extreme cases—the first optimized for speed, the second—for minimizing memory consumption. The implementation also provides a flexible mode of loading, via a parameter setting that specifies how much memory should be used for mapping. For example, working with a 12 GB file, the system can specify to memory map 3 GB (or any other amount), and the rest is handled by on-demand loading.

With on-demand loading, the implementation can run on platforms that do not have enough RAM for a whole model. The same evaluation task was run, with the same text, on five different platforms, using the same two language models.

TABLE 6

Retrieval performance for 2- and 5- grams, with two different data sources, in different loading modes.

|  |  | 2-grams | | | | 5-grams | | | |
| --- | --- | --- | --- | --- | --- | --- | --- | --- | --- |
|  |  | RAM used | | Total | Average | RAM used | | Total | Average |
| LM data source | Loading mode | Active Tree (MB) | Secondary cache | search time (seconds) | rate queries/ sec | Active Tree (MB) | Secondary cache | search time (seconds) | rate queries/ sec |
| Giga- word | odl-cold | 60 | 4 MB | 138.05 | 750 | 230 | 4 MB | 595.12 | 174 |
|  | odl-warm | 54 | 4 MB | 1.30 | 80206 | 233 | 4 MB | 4.52 | 22930 |
|  | Full | 57 | 9 GB | 0.71 | 145142 | 227 | 9 GB | 1.99 | 52118 |
| Google Web1T | odl-cold | 66 | 5 MB | 116.50 | 890 | 295 | 5 MB | 602.79 | 172 |
|  | odl-warm | 67 | 5 MB | 1.55 | 66887 | 282 | 5 MB | 6.65 | 15595 |
|  | Full | 66 | 12 GB | 0.84 | 123302 | 298 | 12 GB | 2.33 | 44429 |

Notes:
Loading modes: 'odl' = on-demand, 'full' = whole file memory-mapped to RAM.
All runs on the same server (specification 1).

Disk access time is a notable factor—the system can be rather slow in the cold-start runs. Memory-mapping is used extensively to facilitate loading times (fast activation); thus, even in cold-start mode, time to first response is always under 1 second. As the operating system caching kicks-in, the implementation's performance accelerates and reaches levels that are quite suitable for intensive text-processing tasks. Performance in the full-loading mode is about 2-3 times faster than with (warm) on-demand loading. However, there is a huge difference in memory consumption—full loading consumes 9 or 12 GB of RAM. With on-demand loading, the implementation performs the same task a little slower, but with just about 70 to 300 MB of RAM (for 2- and 5-gram tests respectively).

Note that deploying the language models was extremely simple—just copy the implementation software (less than 1 MB) and the compiled LM file (9 or 12 GB). Results of evaluation are presented in Table 7. Timing values were averaged across four separate runs in each condition. Not surprisingly, there is a marked difference in performance between cold and warm starts, indicating that disk access is the most significant source of delay. All runs used on-demand loading method, which minimizes memory use. Note that memory used by Secondary Cache (which stores compressed portions of the LM) is relatively stable, about 4 MB for LM based on Gigaword data and about 5 MB for the larger LM based on Google Web1T.

TABLE 7

Retrieval performance for 2- and 5- grams, with two different data sources, on several different platforms.

| | | 2-grams | | | 5-grams | | |
|---|---|---|---|---|---|---|---|
| Platform | LM data source | Total search time (sec) | Average rate 2-grams/sec | LM RAM use | Total search time (sec) | Average rate 5-grams/sec | LM RAM use (MB) |
| *Warm-start* | | | | | | | |
| 1. Linux server, high end | Gigaword | 1.30 | 80206 | 4 + 54 | 4.52 | 22930 | 4 + 233 |
| | Google Web1T | 1.55 | 66887 | 5 + 67 | 6.65 | 15595 | 5 + 282 |
| 2. Linux server, mid-range | Gigaword | 2.30 | 45178 | 4 + 50 | 8.70 | 11916 | 4 + 232 |
| | Google Web1T | 3.62 | 31024 | 5 + 63 | 11.64 | 8912 | 5 + 282 |
| 3. Linux server, low end | Gigaword | 2.13 | 48735 | 4 + 53 | 8.93 | 11640 | 4 + 230 |
| | Google Web1T | 2.36 | 43986 | 5 + 64 | 10.61 | 9833 | 5 + 288 |
| 4. Windows 7 laptop | Gigaword | 3.05 | 32492 | 4 + 51 | 12.63 | 7841 | 4 + 207 |
| | Google Web1T | 3.53 | 28046 | 5 + 61 | 13.61 | 7300 | 5 + 271 |
| 5. Windows XP desktop | Gigaword | 4.88 | 21232 | 4 + 35 | 23.32 | 4446 | 4 + 148 |
| | Google Web1T | 7.18 | 14437 | 5 + 43 | 27.73 | 3738 | 5 + 190 |
| *Cold-start* | | | | | | | |
| 1. Linux server, high end | Gigaword | 138.05 | 750 | 4 + 60 | 595.12 | 174 | 4 + 230 |
| | Google Web1T | 116.50 | 890 | 5 + 66 | 602.79 | 172 | 5 + 295 |
| 2. Linux server, mid-range | Gigaword | 162.81 | 636 | 4 + 60 | 656.18 | 158 | 4 + 232 |
| | Google Web1T | 166.67 | 622 | 5 + 72 | 686.50 | 151 | 5 + 292 |
| 3. Linux server, low end | Gigaword | 152.54 | 679 | 4 + 60 | 634.77 | 163 | 4 + 229 |
| | Google Web1T | 158.98 | 653 | 5 + 72 | 687.20 | 151 | 5 + 290 |
| 4. Windows 7 laptop | Gigaword | 213.69 | 463 | 4 + 49 | 834.11 | 119 | 4 + 207 |
| | Google Web1T | 211.52 | 468 | 5 + 63 | 882.00 | 112 | 5 + 269 |
| 5. Windows XP desktop | Gigaword | 222.22 | 466 | 4 + 35 | 894.91 | 115 | 4 + 148 |
| | Google Web1T | 207.83 | 498 | 5 + 43 | 950.65 | 109 | 5 + 190 |

Notes:
Amount of RAM use is expressed by two numbers: Secondary Cache size + Active Tree size.
All runs conducted with on-demand loading mode.

Wildcard Query Performance

The implementation's performance for wildcard queries is illustrated in Table 8. Two sample wildcard queries were run, using the same two database files as above, on five different platforms. On-demand loading was used in all conditions. Timing values were averaged across four separate runs in each condition (warm cache only).

Query 1, 'to_*_b*d', returns 18607 trigrams for Google Web1T data source (8085 for Gigaword), among them 'to address beyond' and 'to international boulevard'. Query 2, 'a_????_b*d_r*_*', returns 165 five-grams (145 for Gigaword), among them 'a rock band rather than' and 'a very broad representation of'. Query 1 is much shorter, but it takes more time to process. This illustrates how the system uses query constraints to limit search. Both queries have a highly frequent first word ('to'/'a'), with large sets of successors at depth 2. For query 1, the system proceeds to a deeper level for each candidate at depth 2. For query 2, it proceeds to a deeper level only for 4-lettered candidates at depth 2.

Performance times are rather fast, considering that the system scans over millions of n-grams. Note, for example, that performance on the high-end server is only about twice faster than on the modest laptop. Memory use for wildcard queries is remarkably low. The implementation used just about 5-6 MB for memory mapping and up to 18 MB for the Active Tree (11 MB on Windows XP, the only 32-bit OS in our experiment). The low memory consumption is achieved by two factors. First, the search is automatically guided and loads only those chunks of data that are potentially useful. Second, upon backtracking, the recursive search automatically unloads used portions of the Active Tree (this is why memory use figures in Table 8 are consistently lower than those in Table 7).

TABLE 8

Retrieval performance for two wildcard queries, with two different data sources, on several different platforms.

|   | Platform | LM data source | Query 1: to * b*d | | Query 2: a ???? b*d r* * | |
|---|---|---|---|---|---|---|
|   |   |   | Total search time (sec) | LM RAM use (MB) | Total search time (sec) | LM RAM use (MB) |
| A. | Linux server, high end | Gigaword | 15.62 | 5 + 18 | 3.40 | 6 + 18 |
|   |   | Google Web1T | 24.78 | 6 + 18 | 4.34 | 6 + 18 |
| B. | Linux server, mid-range | Gigaword | 27.86 | 5 + 18 | 5.40 | 6 + 17 |
|   |   | Google Web1T | 46.59 | 6 + 18 | 7.34 | 6 + 18 |
| C. | Linux server, low end | Gigaword | 25.85 | 5 + 18 | 5.39 | 6 + 17 |
|   |   | Google Web1T | 40.69 | 6 + 18 | 6.81 | 6 + 18 |
| D. | Windows 7 laptop | Gigaword | 31.71 | 5 + 18 | 5.91 | 6 + 17 |
|   |   | Google Web1T | 52.70 | 6 + 18 | 8.09 | 6 + 18 |
| E. | Windows XP desktop | Gigaword | 65.02 | 5 + 11 | 10.63 | 6 + 11 |
|   |   | Google Web1T | 103.47 | 6 + 11 | 14.96 | 6 + 11 |
|   | Retrieves: | Gigaword | 8085 trigrams | | 145 five-grams | |
|   |   | Google Web1T | 18607 trigrams | | 165 five-grams | |

Notes:
All times are for warm-cache runs with on-demand loading mode. Amount of RAM use is expressed by two numbers: Secondary Cache size + Active Tree size.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

While the present invention has been described in terms of exemplary embodiments, it will be understood by those skilled in the art that various modifications can be made thereto without departing from the scope of the invention as set forth in the claims.

What is claimed is:

1. A computer memory storing a data structure representing a ternary search tree for word n-grams for a corpus of documents, the data structure comprising:
  a plurality of records, each record representing a node of a ternary search tree and each record comprising a plurality of fields, the ternary search tree representing multiple word n-grams, at least some of said word n-grams comprising a sequence of units, the plurality of records being stored at said computer memory;
  wherein the plurality of fields of a record for each node including a given node includes:
    a first field for identifying a given unit of the sequence of units for the given node;
    a second field reserved for storing payload information for the given node; and
    plural child fields reserved for storing information for a first hi-child node, a second lo-child node and an third equal-child node of the given node; and
  wherein the plural child fields store one of a null value indicating the absence of an associated child node or an identifier identifying a memory location of the respective child node;
  wherein, for at least one record of said data structure, at least one of said plural child fields stores an identifier identifying a memory location of another computer memory different than said computer memory; and wherein the ternary tree is configured to be searched by comparing units of a query to nodes of the ternary tree, wherein a current unit of the query is compared to the payload information of a current node of the ternary tree, and wherein i) if the current unit of the query matches the payload information, then selecting the equal-child node as the current node; ii) if the current unit of the query is less than the payload information, then selecting the lo-child node as the current node; and iii) if the current unit of the query is greater than the payload information, then selecting the hi-child node as the current node.

2. The computer memory of claim 1, wherein the given unit is a character of a particular word n-gram.

3. The computer memory of claim 1, wherein the given unit is a 1-byte value representing a part of a particular word n-gram.

4. The computer memory of claim 1, wherein each record representing a node of the ternary search tree is individually compressed in serialized form.

5. The computer memory of claim 1, wherein the data structure is configured such that new records representing new nodes of the ternary search tree can be added to the data structure to thereby update the data structure without recompiling the entire data structure.

6. The computer memory of claim 1, wherein the data structure is configured to support wildcard searches of the data structure without the use of additional indexing designed to facilitate wildcard searches.

7. The computer memory of claim 1, wherein the payload information comprises statistical information related to a count for a particular word n-gram.

8. A computer-implemented method of populating a data structure in a computer memory, the data structure representing a ternary search tree, the ternary search tree representing multiple word n-grams for a corpus of documents, the method comprising:
  a) selecting a unit of a word n-gram with a processing system, wherein said word n-gram comprises a sequence of units;
  b) creating a node of a ternary search tree based on the first unit with the processing system, wherein the node is represented by a record of the data structure, the record being stored at said computer memory;
  c) selecting another unit of the word n-gram with the processing system;
  d) if said another unit does not already exist as a node in the ternary search tree for said word n-gram, creating another node of the ternary search tree based on said another unit with the processing system, wherein said another node is represented by another record of the data structure; and
  e) repeating steps (a)-(d) to create additional nodes of the ternary search tree for additional word n-grams;

wherein each of said records comprises a plurality of fields, wherein the plurality of fields include:
  a first field for identifying a given unit of the sequence of units for a given node;
  a second field reserved for storing payload information for the given node; and
  plural child fields reserved for storing information for a first hi-child node, a second lo-child node and an third equal-child node of the given node;
wherein the plural child fields store one of a null value indicating the absence of an associated child node or an identifier identifying a memory location of the respective child node;
wherein, for at least one record of said data structure, at least one of said plural child fields stores an identifier identifying a memory location of another computer memory different than said computer memory; and
wherein the ternary tree is configured to be searched by comparing units of a query to nodes of the ternary tree, wherein a current unit of the query is compared to the payload information of a current node of the ternary tree, and wherein i) if the current unit of the query matches the payload information, then selecting the equal-child node as the current node; ii) if the current unit of the query is less than the payload information, then selecting the lo-child node as the current node; and iii) if the current unit of the query is greater than the payload information, then selecting the hi-child node as the current node.

9. The method of claim 8, wherein the given unit is a character of a particular word n-gram.

10. The method of claim 8, wherein the given unit is a 1-byte value representing a part of a particular word n-gram.

11. The method of claim 8, comprising individually compressing each record representing a node of the ternary search tree in serialized form.

12. The method of claim 8, comprising adding new records representing new nodes of the ternary search tree to the data structure to thereby update the data structure without recompiling the entire data structure.

13. The method of claim 8, wherein the data structure is configured to support wildcard searches of the data structure without the use of any additional indexing specially designed to facilitate wildcard queries.

14. The method of claim 8, wherein the payload information comprises statistical information related to a count for a particular word n-gram.

15. An article of manufacture comprising a non-transitory computer readable storage medium comprising processing instructions, which when executed, cause a processing system to carry out the method of claim 8.

16. A system for populating a data structure in a computer memory, the system comprising a processing system and a memory, the processing system configured to carry out the method of claim 8.

* * * * *